(12) United States Patent
Calligaro et al.

(10) Patent No.: US 7,017,004 B1
(45) Date of Patent: Mar. 21, 2006

(54) SYSTEM AND METHOD FOR UPDATING CONTENTS OF A FLASH ROM

(75) Inventors: Michael P. Calligaro, Redmond, WA (US); Chee H. Chew, Redmond, WA (US); Dominique Fortier, Snoqualmie, WA (US); Eric Lawrence Albert Lantz, Sammamish, WA (US); Randal James Ramig, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 184 days.

(21) Appl. No.: 10/112,243

(22) Filed: Mar. 29, 2002

(51) Int. Cl.
G06F 12/00 (2006.01)

(52) U.S. Cl. .................. 711/102; 711/102; 711/103; 711/100; 711/104; 711/170; 711/171; 711/173; 711/172; 713/1; 713/2; 713/100; 713/155; 713/160; 713/161; 713/164; 713/165; 713/166; 713/167; 365/230.01; 365/230.02; 365/230.03; 365/230.04

(58) Field of Classification Search .............. 711/147, 711/100, 102–103, 104; 713/1–2, 191, 200, 713/170–171, 176, 180, 100, 155, 161, 164–167, 713/160; 345/745; 365/200, 230.01, 230.04; 395/497
See application file for complete search history.

(56) References Cited

U.S. PATENT DOCUMENTS

| 5,522,076 | A | * | 5/1996 | Dewa et al. ................ 713/2 |
| 5,535,369 | A | * | 7/1996 | Wells et al. ................ 711/171 |
| 5,579,529 | A | * | 11/1996 | Terrell et al. ................ 710/8 |
| 5,710,492 | A | * | 1/1998 | Konishi et al. ................ 318/156 |
| 5,778,070 | A | * | 7/1998 | Mattison ................ 713/191 |
| 5,802,592 | A | | 9/1998 | Chess et al. |
| 5,854,937 | A | * | 12/1998 | Woodward ................ 712/1 |
| 5,860,082 | A | * | 1/1999 | Smith et al. ................ 711/103 |
| 5,870,520 | A | * | 2/1999 | Lee et al. ................ 714/6 |
| 6,122,733 | A | * | 9/2000 | Christeson et al. ................ 713/2 |
| 6,154,838 | A | * | 11/2000 | Le et al. ................ 713/2 |
| 6,182,187 | B1 | * | 1/2001 | Cox et al. ................ 711/5 |
| 6,262,726 | B1 | * | 7/2001 | Stedman et al. ................ 345/745 |
| 6,308,265 | B1 | * | 10/2001 | Miller ................ 713/2 |
| 6,405,309 | B1 | * | 6/2002 | Cheng et al. ................ 713/1 |
| 6,412,040 | B1 | * | 6/2002 | Hasbun et al. ................ 711/103 |
| 6,434,695 | B1 | * | 8/2002 | Esfahani et al. ................ 713/2 |
| 6,553,490 | B1 | * | 4/2003 | Kottapurath et al. ................ 713/2 |
| 6,615,404 | B1 | * | 9/2003 | Garfunkel et al. ................ 717/173 |
| 6,711,690 | B1 | * | 3/2004 | Dayan et al. ................ 713/202 |
| 2002/0166061 | A1 | * | 11/2002 | Falik et al. ................ 713/200 |
| 2003/0065935 | A1 | * | 4/2003 | Neufeld ................ 713/200 |
| 2004/0049627 | A1 | * | 3/2004 | Piau et al. ................ 711/103 |

* cited by examiner

Primary Examiner—B. James Peikari
Assistant Examiner—Zhuo H. Li
(74) Attorney, Agent, or Firm—Lee & Hayes, PLLC

(57) ABSTRACT

Upgrading a non-volatile memory image such as a flash ROM is accomplished by partitioning the flash ROM into a plurality of flash ROM regions. One of the flash ROM regions is selected to receive the software upgrade, which can then be directly overwritten without having to overwrite the flash ROM image in its entirety. Through the use of an image buffer, which stores information about the ROM regions, it is possible to move ROM regions, delete ROM regions, add ROM regions, expand/contact ROM regions, update ROM regions, and enable/disable ROM regions without having to modify the entire ROM image or shadow parts of the ROM image in RAM. Additionally, security and registry information can also be logically linked to a particular region.

33 Claims, 4 Drawing Sheets

326

| Region | Purpose of Region | Start Address | Length |
|---|---|---|---|
| 1 | Boot Loader | 80000000 | X bytes |
| 2 | Kernel | 80004000 | . |
| 3 | OS + Image Buffer | 802C2000 | . |
| 4 | Shell | 805C2000 | . |
| 5 | Browsing | 80780000 | . |
| 6 | Core Apps. | 80A40000 | . |
| 7 | Drivers | 81080000 | . |
| . | . | . | . |
| N | N | N | N |

Update Original Contents D With Software Update H

SYSTEM AND METHOD FOR UPDATING CONTENTS OF A FLASH ROM

TECHNICAL FIELD

This invention relates to updating and maintaining a non-volatile memory, and more particularly, to systems and methods for updating and maintaining the contents of a flash read-only-memory (ROM).

BACKGROUND

Most handheld computers are equipped with limited memory resources. Usually, the memory resources are split into three sections: (1) ROM used to bootstrap the handheld computer when power is turned-on and contains the operating system (OS) and programs which provide access to low-level applications; (2) random access memory (RAM) used as an execution area for the computer's processor(s); and RAM used as file system storage.

Programs stored in ROM were originally permanently "burned-in" and could only be replaced by physically replacing the ROM medium. Now, with the advent of configurable non-volatile memory devices, such as flash memory devices, it is possible to update the contents of a ROM without physically replacing the ROM medium.

There are generally two common techniques used to update the contents of a flash ROM in handheld computers. The first technique is commonly referred to in the industry as "shadowing," which involves storing updateable components of the ROM in the RAM file system area. The handheld computer then accesses the updated components from the RAM file system rather than the prior version of the component originally stored in ROM. There are, however, several problems with shadowing. Updated components consume valuable RAM space. Some updates in fact, are often tool large to fit in the RAM file system. Additionally, if the handheld computer is ever cold booted (in which the RAM is cleared) then the updates will be permanently lost.

Another technique used to update the contents of a ROM involves re-flashing the entire ROM image using the boot loader. The boot loader or "bootstrap" is used to initially instruct the handheld computer to load certain components in the ROM when the handheld computer is cold or warm booted. A drawback with this technique is that most handheld computers have limited memory and are unable to store the entire new version of the ROM image while performing the re-flash. So, in most situations, the entire updated ROM image must be staged on a companion host computer and fed to the handheld device via an interconnect, such as a serial or USB interconnect.

In any event, many of the components stored in ROM are manufactured and owned by different entities. This creates a dilemma when it is necessary to modify a component of the ROM, which requires modifying the entire ROM image; including components potentially not owned by the party that desires to release the updated component. So when one entity desires to modify its component to the ROM, it may not be possible to obtain access or permission to copy the rest of the ROM components owned by one or more third party entities.

SUMMARY

A system and method for upgrading a non-volatile memory image such as a flash ROM is described. In one described implementation, a flash ROM is upgraded with a newer version of the flash ROM. This is accomplished by partitioning the flash ROM into a plurality of flash ROM regions. One or more selected flash ROM regions can then receive a software update(s), by overwriting the one or more selected flash ROM regions with the software update(s), without having to overwrite the flash ROM image in its entirety.

The following implementations, therefore, introduce the broad concept of maintaining a flash ROM image as a plurality of flash ROM regions whereby most of the flash ROM regions can be reconfigured, without having to reconfigure the entire flash ROM image or shadow parts of the ROM image in RAM. Through the use of an image buffer, which stores information about the ROM regions, it is also possible to move ROM regions, delete ROM regions, add ROM regions, expand/contract ROM regions, update ROM regions, and enable/disable ROM regions without having to modify the entire ROM image. Additionally, security and registry information can also be logically linked to respective ROM regions.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

The following discussion is directed to maintaining and updating the contents of flash ROMs. The subject matter is described with specificity to meet statutory. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

EXEMPLARY COMPUTER SYSTEM

Figure 1:
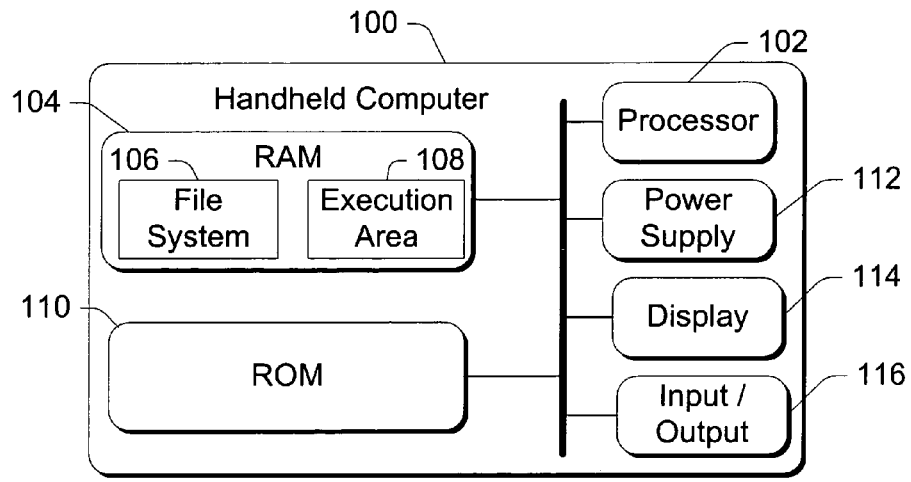
FIG. 1 illustrates functional components of a handheld computer.

FIG. 1 illustrates functional components of a handheld computer 100. The handheld computer 100 represents most portable processing systems, such as portable wireless communication handsets, palmtops, personal digit assistants (PDAs), pocket personal computers (PCs), portable gaming systems, multimedia systems, the combination of any of the above examples devices and/or systems, and other similar computer devices. Handheld computer 100 includes a processor 102, RAM 104, ROM 110, a power supply 110, display 112 and input/output interfaces 114. RAM 104 is a volatile memory. Resident on the RAM is file system RAM 106 and execution area RAM 108 as explained above. ROM 110 exemplifies non-volatile memory for computer 100. In most instances the non-volatile memory is implemented in flash memory (referred to as "flash ROM") although any type of configurable non-volatile memory can be used to implement the ROM 110.

The handheld computer 100 has a power supply 110 that is generally implemented through rechargeable batteries. The power supply 110 might further include an external power that overrides or recharges the built-in batteries, such as an AC adapter or powered docking cradle. The display 112 can take many forms such as a screen, touch screen, LEDs, etc. The input-output interfaces 114 can also take many forms depending on the handheld computer 100 such as a keyboard, IR port, serial port, and so forth. The handheld computer 100 can include more than one of any of the aforementioned elements. Other elements such as touch pads, vibrating devices, wireless communication components and so forth are not shown, but could easily be a part of the exemplary handheld computer 100.

EXEMPLARY NON-VOLATILE MEMORY IMAGES

Figure 2:
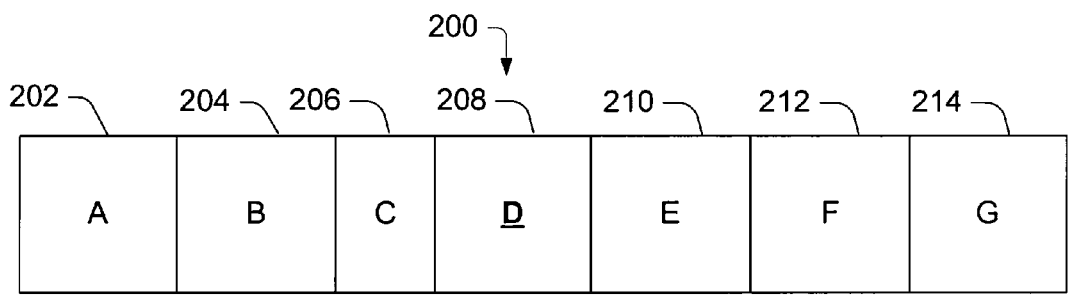
FIG. 2 shows an exemplary implementation of a ROM image.
Figure 2:
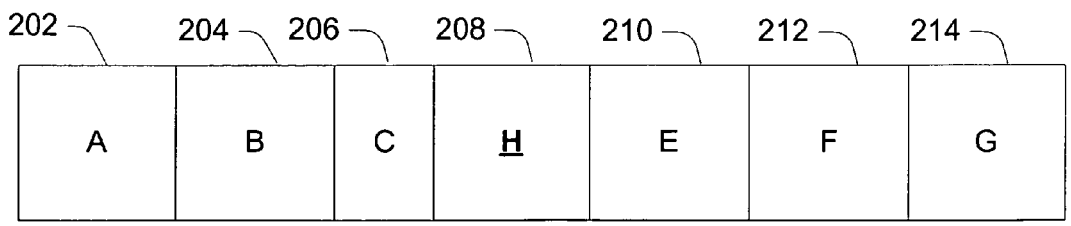

FIG. 2 shows an exemplary implementation of a ROM image 200 stored in ROM 110. The image 200 is logically partitioned into a plurality of separate independent regions 202–214. Each of the regions 202–214 can be logically viewed as a plurality of independent ROMs that function together forming the entire ROM image 200. Although each region is shown as being contiguous, it is possible that that the actual logical and/or physical address locations for each region may be at various arbitrary areas in a flash ROM 110 that are not necessarily contiguous. Each of the regions 202–214 can also vary in size depending on the contents intended for a particular region.

Each of the regions 202–214 are intended to store embedded software devices and/or application programs (hereinafter referred to as application programs), the contents of which are represented by A–G. In one implementation, an application program is assigned to one specific region, although it is possible for the contents of an application program to span across several regions. An application program is generally restricted to a specific region to reduce the size of files needed to be downloaded when updating an application program. That is, instead of updating multiple regions, by restricting an application program to a single region, it is only necessary to update one region.

Accordingly, the contents of each application program can be updated by overwriting the contents of a particular region. For example, suppose in FIG. 2 that it is desired to update the original contents of application program D with a new version of the application program called H. Accordingly, the contents of region 208 can be overwritten with updated software H. Thus, upgrading old versions of application programs stored in ROM 110 can be can be performed without the need to update the entire ROM image 200 or shadow an updated application program of the ROM in RAM 104.

Figures 3, 4:
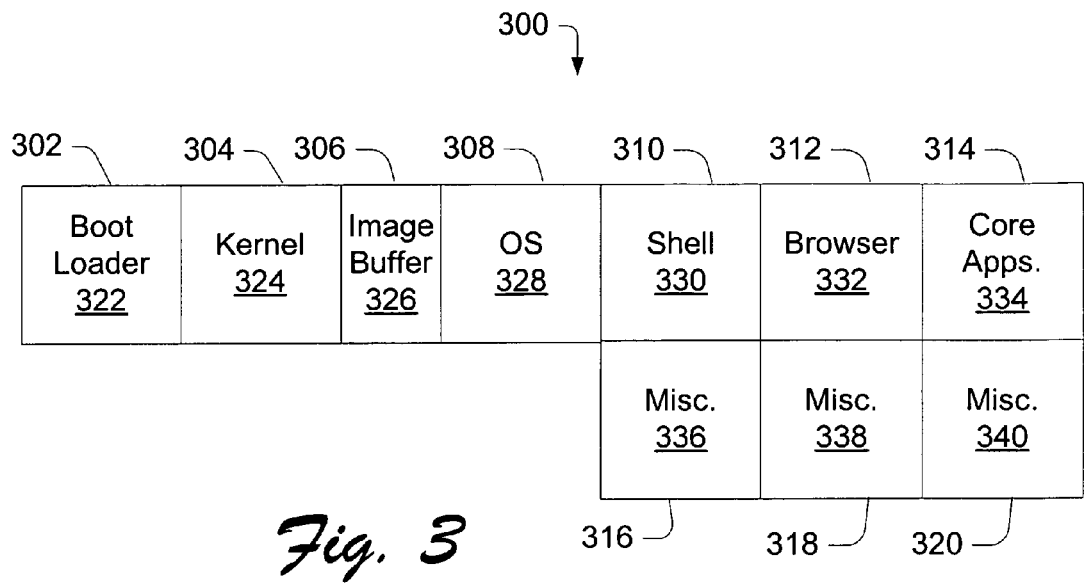
FIG. 3 shows another implementation of exemplary flash ROM image.
FIG. 4 illustrates an exemplary implementation of an image buffer.

FIG. 3 shows another implementation of exemplary flash ROM image 300 stored in ROM 110. ROM image 300 includes regions 302–320. Resident within regions 302–320 is a boot loader 322, a kernel 342, an image buffer 326, an operating system (OS) 328, a shell 330, an internet browser 332, core applications 334, and miscellaneous applications 336–340, respectively.

Boot loader 322 is used by the handheld computer 100 to bootstrap the computer when power is turned-on. The kernel 324 serves to provide low-level access to hardware components in handheld computer 100. Kernel 324 also transfers control to the operating system 328.

The image buffer 326 serves as the bootstrap for the operating system 328. That is, the operating system 328 reads the image buffer 326 to determine address locations and sizes for regions 302–320. The image buffer 326 is a configurable data structure normally stored in a separate region (e.g., 306) of ROM image 300; although the image buffer can co-reside within other regions such as with the OS 328 or be resident in other areas of flash memory. The operating system 328 references the contents of the image buffer 326 rather the kernel or boot loader 322 for mapping information about the ROM image 300. For instance, the OS is able to determine the start address of each region, length of each region, and file contents of a region, by referencing the image buffer 326.

FIG. 4 illustrates an exemplary implementation of the image buffer 326. When the handheld computer initially boots, the kernel 324 reads the image buffer to determine where all the regions are located. Essentially, the image buffer 326 is a data structure that includes a region column 402, contents column (or also referred to as the "Purpose of Region" column) 404, start address column 406 and length column 408. Other information could be maintained by the image buffer, including security information associated with particular regions, ownership of a particular region (i.e., an entity that has access to update the contents of a region) and other information that may be useful to the kernel, OS or other component of the handheld computer 100.

Generally, region column 402 delineates a list of regions and includes up to N total regions. The Purpose of Region column 404 includes the main application program stored within a region as well as any files associated with the application stored in the region. The contents column 404 is in essence a table of contents for each region. The table of contents can reside within the region itself. Whereas, the start address column 406 and length column 408 provide information necessary to logically identify the locations of specific regions. The image buffer is dynamically configurable (e.g., its pointers to the table of contents, etc.) and can be updated when an updated software program is installed on handheld computer 100. It is also possible to reconfigure the contents of the image buffer by connecting the handheld computer to a host device.

Information stored within the image buffer 326 is generally configurable. So in the event a software upgrade is written to a particular region, it is possible to modify the address location and/or size of the region to correspond to the software upgrade. It may also be possible modify the size of a region (expand or contract), or move an entire application from one region to another region. For example, if the software update was larger than a previous version of a software application stored in a region, then it may be necessary to store the upgrade in a different, but larger allocated region.

Besides being able to move regions and expand regions by reconfiguring the image buffer 326, regions can also be activated or deactivated from ROM 110 by enabling information (in the form shown in FIG. 4) to be installed about the region in the image buffer or removing information about a particular region from the image buffer. For the case of deactivating a region, if information about a region is removed from the image buffer 326, then at boot time the kernel 324 and/or OS 328 is not able to access information about the region. Accordingly, the region (although it may be physically resident on the ROM 110) is effectively removed from the ROM image 300. Accordingly, the deactivated region cannot be utilized unless information about it is stored in the image buffer (e.g., activated).

Referring back to FIG. 3, the OS 328 is resident in region 308 and executes on the processor 102. An example operating system implementation includes the Windows®CE operating system from Microsoft Corporation, but other operating systems can be selected from one of many operating systems. For purposes of illustration, programs and other executable program components such as the operating system are illustrated herein as discrete blocks, although it is recognized that such programs and components reside at various times in different storage components of the handheld computer 100, and are executed by the processor(s) 102.

One or more application programs (e.g., shell 330, browser 332, core applications 334 and other miscellaneous applications 336–340) reside in regions 310–320. These applications generally operate in conjunction with the OS 328. Examples of applications include, but are not limited to, email programs, word processing programs, spreadsheets programs, Internet browser programs, as so forth. All application programs (330–340) shown in this exemplary implementation can be upgraded by overwriting the contents of the ROM region in which the application resides within an updated version of the application program.

In one implementation, the boot loader 322, kernel 324 and OS 328 cannot be updated by individually updating he contents of the region in which these application programs reside. Generally, the entire ROM image 300 (or at least regions 302, 304, 308) will need to be replaced in order to accomplish an update of these application programs.

LAYOUT OF ROM IMAGE

The layout of ROM image 300 is intended to group each application with all its components within a specific region. As explained above, this minimizes the need to update multiple regions when updating an application program. In one implementation, each ROM region is aligned at a 256 k-byte block increments. This is generally a compatible block boundary size common with memory controller chips; however, various sized block increment sizes could be selected (one-to-two megabytes in one implementation).

The size of each region is dependent upon the application program intended to reside within each region. When initially laying out the ROM image 300, generally each region is partitioned using a block size that is generally larger than the actual size of the application program intended for that region. Providing extra space in each region supplies additional growth space in the event an upgrade to an application program is larger than the contents of the original version of the application program. Moreover, allocating slightly larger partitioned ROMs also allows for growth in the event an application program in development turns-out to require more memory space than initially anticipated.

The size of a ROM 110 is dictated by SKU. The SKU size of dictates the number of application regions. For example, a larger SKU size allows for the inclusion of additional applications, therefore additional functionality, potentially increasing the value of a device. Nevertheless, certain application programs may consistently remain the same size irregardless of the SKU size, such as shell 330, browser 332, etc. However, the larger the SKU size, the more options there are in laying out region sizes as well as for providing spare regions for potential future application programs.

UPDATE PROCESS

A method for updating a non-volatile memory image representing ROM of the handheld computer 100 involves receiving an update file and overwriting a selected region with a software update contained within the file. Since each region is in essence a semi-independent ROM that is proportionally smaller than the entire ROM image, it is possible to overwrite the contents of specified region without the need to perform shadowing or having to overwrite the contents of the ROM image in its entirety.

Figure 5:
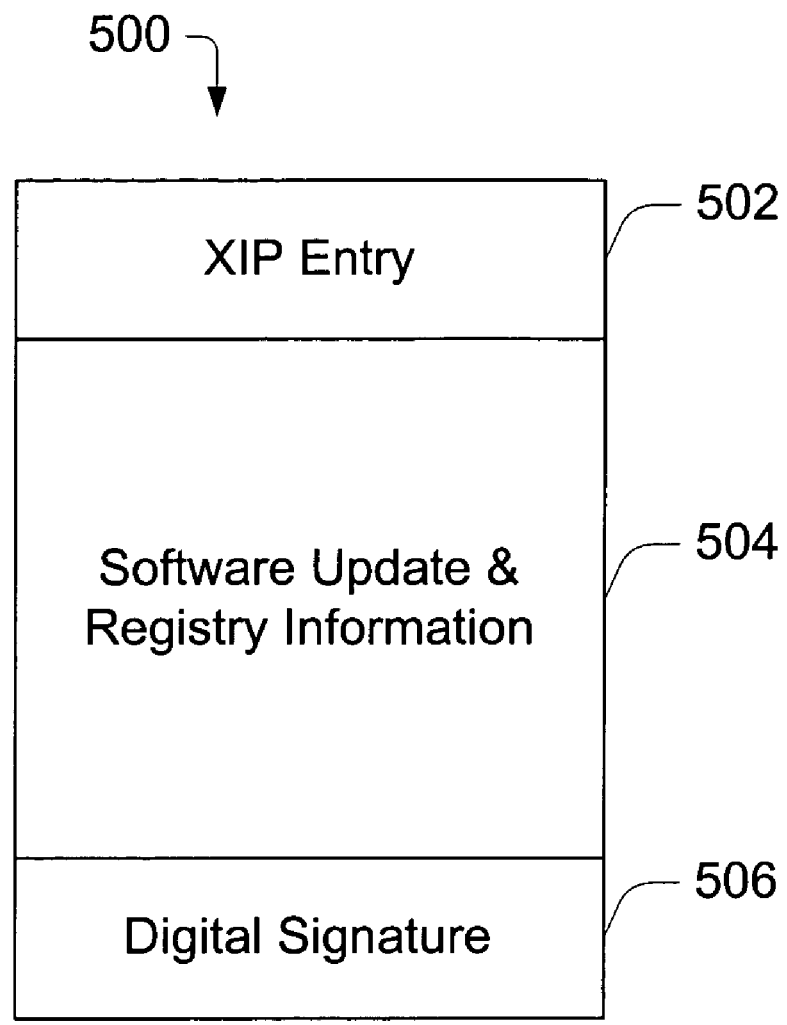
FIG. 5 shows an exemplary update file used to update one or more regions of a ROM image.

FIG. 5 shows an exemplary update file 500 used to update one or more regions of a ROM image. In one implementation, the update file 500 includes an XIP entry header 502, a software update 504 that may include updated registry information; and a digital signature 506. XIP stands for execute-in-place, which in certain types of ROM permits code to run directly from the ROM 110 on the processor 102 without having to be loaded into RAM 104. Windows®CE operating system from Microsoft Corporation allows XIP files to be created using a tool called "Make Image" available from Microsoft Corporation. Other file types could be used depending on the operating system selected for the handheld computer 100.

The XIP entry header 502 contains information about the size of the software update contained within section 504, the destination region for the software update, and the start address for the region. In other implementation it is possible to include other information in the XIP entry header, such as the version of the software update, a public key and so forth. Much of the information contained in the XIP header 502 is used to generate the process needed to update a region. Instructions used to initiate and complete an update can also be included within the XIP header 502.

As mentioned above, software update and registry information 504 is embedded in the update file 500. Besides the contents of the software itself, registry command updates associated with user preferences may also be a part of the software update.

The digital signature 506 of the XIP file provides unique security information about the file 500. This digital signature is checked against a security key saved in the image buffer 306 (or other region of the ROM image). This guarantees that the software update is legitimate prior to the software update being installed in the ROM 110. Having private keys ensures that only certain owners of a particular ROM region can build and update contents of the ROM image 300. Security also ensures that the ROM 110 does not become replaced with corrupted unauthorized files, which could cause catastrophic failure for the handheld computer 100.

Figure 6:
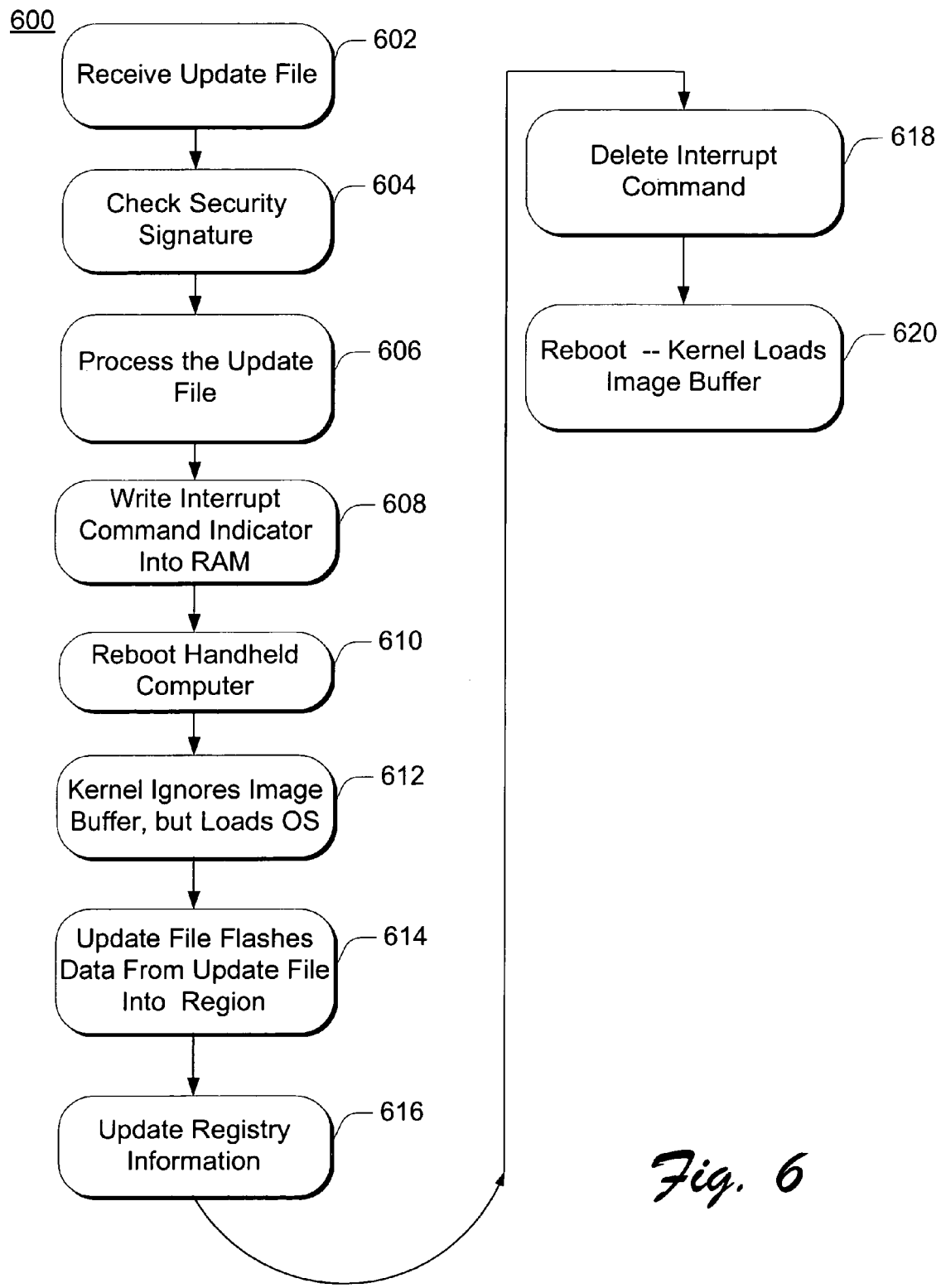
FIG. 6 is a flow chart illustrating a process of updating one or more regions of a non-volatile memory.

FIG. 6 is a flow chart illustrating a process 600 of updating one or more regions (such as regions 310–320) of a non-volatile memory. Process 600 includes operation steps 620–620. The order in which the process is described is not intended to be construed as a limitation. The steps are performed by computer-executable instructions stored in memory in the handheld computer 100. Alternatively, the process 600 can be implemented in any suitable hardware, software, firmware, or combination thereof.

In step 602, the handheld computer 100 receives an update file (500 shown in FIG. 5) containing software update 504 and stores the file 500 in RAM 104. The update file is usually received from the input/output interface 116. The update file may be sent from a host device or installed locally through a disk drive etc. Once the file is received and located into RAM, it contains coded instructions in the XIP header 502 to provide the user of handheld computer 100 with information on display 114 that a ROM process is in progress.

In step 604, once the update file 500 is loaded into RAM, the OS 328 verifies through the processor 102 whether the digital signature contained in the header 502 matches the security key for the region intended to be updated by the file. If the digital signature matches the security key, process 600 is permitted to proceed. Otherwise if there isn't a match, the process 600 is terminated and the user is notified on the display 114 that the ROM update file is invalid and will be deleted. Many different encrypted security techniques can be used to implement step 604 and different manufactures can own different regions, ensuring that different regions of the ROM image can be updated without obtaining permission from another contributor to the ROM image (another owner of one or more regions of the ROM image).

In step 606 the update file 500 is further processed by opening the XIP header 502. The user may be prompted through a dialogue box to select a "Continue" box to ensure the user wants to install the update file 500. The user may also be prompted to ensure that this adequate power supply and not to turn-off the handheld computer 100 during the update process, otherwise a catastrophic failure may occur.

In step 608, a write an interrupt update command is sent from the file 500 and written into RAM 104. This interrupt update command is a "cookie" or flag that instructs the kernel 324 when booting-up not to load the image buffer 306.

In step 610, the handheld computer 100 is automatically rebooted (warm boot). The kernel 324 is coded to read the address in RAM associated with an interrupt update command each time the kernel 324 initiates operation after a warm-boot to verify whether any updates are being requested.

Once the kernel 324 reads the interrupt update command, in step 612, the kernel ignores the image buffer 326. That is, kernel 324 reads the update interrupt command from RAM 104 and disengages the image buffer 326. Next, the kernel launches the OS 328. The OS 328 does not see the image buffer 326, because it has been temporarily invalidated by the kernel 324. The OS 328 only sees the kernel 324 as the only other region in the ROM image 300. As a result the OS 328 does not load any other regions. This avoids potentially erasing and writing to an active region, which can cause the handheld computer 100 to fail.

In step 614, the update file running on the processor 102, flashes the software update data 504 contained in the update file 500 to one of the regions (e.g., 310–320) associated with the software update.

In step 616, registry information 504 stored in the update file 500 is also downloaded in the region and linked with any other potential registry information stored in RAM 104. That is, in one exemplary implementation, registry information is stored in each region 310–320 for all of the applications in that region. There is registry file in each region 310–320. This information is re-recorded in the region 310–320 and linked with any new registry data associated with the software update file 500.

Next, in step 618, once the update file 500 has been successfully written into a region, the file 500 writes a code back to the kernel (sets a flag in the RAM) so that image buffer 326 is active again.

In step 620, the handheld computer 100 automatically reboots and now the kernel loads the image buffer 326. Accordingly, the OS 328 is able to access the image buffer 326 and use it as a bootstrap for loading other regions (e.g., 310–320) of the ROM image 300.

COMPUTER READABLE MEDIA

An implementation of exemplary subject matter updating and maintaining a flash ROM as described above may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. In a computer system containing a processor coupled to a non-volatile memory system for storing a non-volatile memory image representing read-only-memory of the computer system, a method for updating the non-volatile memory image with a software update, the method comprising:
    processing the software update by the processor to validate the software update, wherein the processor is to execute an operating system;
    partitioning the non-volatile memory image into a plurality of non-volatile memory regions, the non-volatile memory regions each potentially having a varying size,
    allocating an image buffer for storing an address location, a size, and a purpose for at least a portion of the non-volatile memory regions;
    designating a selected non-volatile memory region to receive the software update by identifying an existing non-volatile memory region at least large enough to accommodate the software update or repartitioning a portion of the non-volatile memory image to form a new non-volatile memory region at least large enough to accommodate the software update;

overwriting the selected non-volatile memory region with the software update without having to overwrite the non-volatile memory image in its entirety; and updating the image buffer such that the address location, the size, and the purpose for the selected non-volatile memory region are current.

2. The method as recited in claim 1, further comprising: issuing an update interrupt command temporarily preventing the operating system of the computer system from recognizing the plurality of non-volatile memory regions.

3. The method as recited in claim 1, wherein processing the software update by the processor to validate the software update further comprises assigning a security signature to the selected non-volatile memory region; and verifying whether the software update contains a matching security signature prior to overwriting the selected non-volatile memory region with the software update.

4. The method as recited in claim 1, wherein overwriting the selected non-volatile memory region with the software update further comprises merging registry data associated with the selected non-volatile memory region with registry data associated with the software upgrade.

5. The method as recited in claim 1, wherein at least a portion of the plurality of non-volatile memory regions include execute-in-place files.

6. One or more computer-readable media comprising computer-executable instructions that, when executed, perform the method as recited in claim 1.

7. A method for maintaining a non-volatile memory of a computer system having a processor coupled to the non-volatile memory, the non-volatile memory containing a boot loader, a kernel, an operating system to be executed by the processor and other functional devices, the method comprising:

partitioning the non-volatile memory into a plurality of non-volatile memory regions;

maintaining an image buffer containing an information entry including an address location, a size, and a purpose for at least a portion of the non-volatile memory regions;

updating the image buffer to reflect changes in the address location, the size, and the purpose of at least one of the non-volatile memory regions; and referencing, by the processor, the image buffer rather than the boot loader and/or kernel to identify the locations of one or more of the non-volatile memory regions.

8. The method as recited in claim 7, wherein the image buffer is a configurable data structure in one of the plurality of non-volatile memory regions.

9. The method as recited in claim 7, further comprising disabling a particular non-volatile memory region from the plurality of non-volatile memory regions by removing at least part of the information entry pertaining to the particular non-volatile memory region from the image buffer.

10. The method as recited in claim 7, further comprising adding an additional non-volatile memory region to the plurality of non-volatile memory regions, by adding an additional information entry pertaining to the additional non-volatile memory region to the image buffer.

11. One or more computer-readable media comprising computer-executable instructions that, when executed, perform the method as recited in claim 7.

12. A method for maintaining a flash ROM in a computer system having a processor, the flash ROM including a kernel, an operation system and other devices, the method comprising:

partitioning the flash ROM into a plurality of flash ROM regions;

storing contents of the kernel, operating systems, and other devices in separate flash ROM regions among the plurality of flash ROM regions;

storing an address location, a size, and a purpose for at least a portion of the plurality of flash ROM regions in an image buffer;

maintaining the image buffer to reflect changes in the address location, the size, and the purpose of at least one of the plurality of flash ROM regions; and enabling the computer system under control of the operation system to access the other devices stored in the plurality of flash ROM regions by referencing the image buffer, wherein the processor is to execute the operating system.

13. The method as recited in claim 12, further comprising:

(a) receiving a file that contains instructions to update the contents of a particular one of the other devices with updated contents;

(b) disabling the computer system from referencing the image buffer;

(c) booting the computer system;

(d) flashing one of the plurality of flash ROM regions that contains the particular one of the other devices with the updated contents; and (e) enabling the computer system to reference the image buffer, after completion of the flashing.

14. The method as recited in claim 13, further comprising assigning a digital security signature to at least a portion of the plurality of flash ROM regions and ascertaining whether the file that contains instructions to update the contents of a particular one of the other devices, contains a matching digital security signature.

15. The method as recited in claim 14, further comprising if the file does not contain a matching digital security signature, then rendering inoperative those acts performed in paragraphs (b) through (e).

16. The method as recited in claim 13, wherein the file is an execute-in-place file that contains address locations for the updated contents.

17. One or more computer-readable media comprising computer-executable instructions that, when executed, perform the method as recited in claim 12.

18. A non-volatile memory system, comprising:

a plurality of flash ROMs having a specified address location and size; each of the flash ROMs containing one or more functional devices;

an image buffer containing address locations, sizes, and purposes for each of the flash ROMs, the image buffer being modifiable to reflect changes in the address locations, the sizes, and the purposes of the flash ROMS; and an operating system to be executed by a processor coupled to the non-volatile memory system, the operating system being stored in at least one of the of the plurality of flash ROMs, wherein during operation of the system the operating system is to read the image buffer and link the plurality of flash ROMs so that they function together as single ROM image.

19. The system as recited in claim 18, wherein at least a portion of the flash ROMs are separately configurable, whereby if contents of one of at least a portion of the flash ROMs are modified, it is not necessary to overwrite contents of at least one of the other flash ROMs.

20. The system as recited in claim 18, wherein at least a portion of the plurality of flash ROMs contain encrypted security codes preventing unauthorized modifications of the flash ROMs.

21. The system as recited in claim 18, wherein at least a portion of the plurality of flash ROMs are configured to store execute-in-place files.

22. One or more computer-readable media having stored thereon computer executable instructions that, when executed by one or more processors coupled to a non-volatile memory system, causes the one or more processor of a computer system to:
- execute an operating system, wherein each of the one or more processors is to selectively execute the operating system;
- receive a file used to update an old version of a non-volatile memory image to a new version of a non-volatile memory image, wherein the new version of the non-volatile memory image contains a software update to the old version of the non-volatile memory image, wherein the non-volatile memory image is logically partitioned into a plurality of non-volatile memory regions, the non-volatile memory regions each potentially having a varying size;
- allocate an image buffer for storing an address location, a size, and a purpose for at least a portion of the non-volatile memory regions;
- process the file by the one or more processors to validate the software update;
- designate a selected non-volatile memory regions to receive the software update by identifying an existing non-volatile memory region at least large enough to accommodate the software update or repartitioning a portion of the non-volatile memory image to form a new non-volatile memory region at least large enough to accommodate the software update;
- overwrite the selected non-volatile memory region with the software update without having to overwrite the non-volatile memory image int its entirety; and
- update the image buffer such that the address location, the size, and the purpose for the selected non-volatile memory region are current.

23. One or more computer-readable media as recited in claim 22, further comprising computer executable instructions that, when executed, direct the computer system to allocate an image buffer containing address locations for each of the plurality of non-volatile memory regions.

24. One or more computer-readable media as recited in claim 22, further comprising computer executable instructions that, when executed, direct the computer system to issue an update interrupt command temporarily preventing the operating system of the computer system from recognizing the plurality of non-volatile memory regions.

25. One or more computer-readable media as recited in claim 22, further comprising computer executable instructions that, when executed, direct the computer system to check whether a security signature embedded in the selected non-volatile memory region matches security signature associated with the software update prior to directing the computer system to overwrite the selected non-volatile memory region with the software update.

26. One or more computer-readable media as recited in claim 22, further comprising computer executable instructions that, when executed, direct the computer system to merge registry data associated with the selected non-volatile memory region with registry data associated with the software upgrade when the computer system is directed to overwrite the selected non-volatile memory region with the software update.

27. One or more computer-readable media having stored thereon computer executable instructions that, when executed by one ore more processors, causes the one or more processors of a computer system to:
- partition a non-volatile memory of the computer system into a plurality of non-volatile memory regions each storing a separate one of a boot loader, a kernel, an operating system and other functional devices;
- execute the operating system, wherein each of the one or more processors is to selectively execute the operating system;
- maintaining an image buffer containing an information entry including an address location, a size, and a purpose for at least a portion of the non-volatile memory regions;
- update the address location in the image buffer to reflect changes in the address location, the sizes, and the purpose of at least one of the non-volatile memory regions; and
- reference the image buffer rather than the boot loader and/or kernel to identify the locations of one or more of the non-volatile memory regions.

28. One or more computer-readable media as recited in claim 27, further comprising executable instructions that, when executed, direct the computer system to disable a particular non-volatile memory region from the plurality of non-volatile memory regions by removing at least part of the information entry pertaining to the particular non-volatile memory region from the image buffer.

29. One or more computer-readable media as recited in claim 27, further comprising computer executable instructions that, when executed, direct the computer system to add an additional non-volatile memory region to the plurality of non-volatile memory regions, by adding an pertaining to the additional non-volatile memory region in the image buffer.

30. A computer system, comprising:
- a processor to execute an operating system,
- a configurable memory device containing a plurality of ROMs each containing software contents and potentially having a varying size;
- an image buffer for storing an address location, a size, and a purpose for at least a portion of the software contents stored in the configurable memory device; and
- ROM update software that when verified and executed by the processor causes:
- the software contents in one of the plurality of ROMs to be overwritten by revised software contents without having to overwrite the other of the plurality of ROMs in their entirety; and
- the image buffer to be updated to reflect changes in the address location, the size, and the purpose for the software contents overwritten by the revised software contents.

31. The computer system as recited in claim 30, wherein the configurable memory device is a non-volatile memory device.

32. The computer system as recited in claim 30, wherein the configurable memory device is a flash memory device.

33. The computer system as recited in claim 30, wherein the image buffer is configurable such that one or more of the plurality of ROMs can be moved, deleted, and/or expanded by modifying the address locations contained in the image buffer.

* * * * *

UNITED STATES PATENT AND TRADEMARK OFFICE
CERTIFICATE OF CORRECTION

PATENT NO. : 7,017,004 B1
APPLICATION NO. : 10/112243
DATED : March 21, 2006
INVENTOR(S) : Calligaro et al.

It is certified that error appears in the above-identified patent and that said Letters Patent is hereby corrected as shown below:

On the Title page, in field (57), in "Abstract", in column 2, line 9, delete "contact" and insert -- contract --, therefor.

In column 1, line 20, after "and" insert -- (3) --.

In column 1, line 37, delete "tool" and insert -- too --, therefor.

In column 1, line 58, after "component" delete "to" and insert -- of --, therefor.

In column 2, line 45, delete "statutory." and insert -- statutory requirements. --, therefor.

In column 2, line 61, delete "examples" and insert -- example --, therefor.

In column 3, line 11, delete "input-output" and insert -- input/output --, therefor.

In column 3, line 54, delete "can be" before "performed".

In column 3, line 61, delete "342," and insert -- 324, --, therefor.

In column 5, line 25, delete "within" and insert -- with --, therefor.

In column 6, line 55, delete "620-620." and insert -- 602-620. --, therefor.

In column 6, line 67, delete "located" and insert -- loaded --, therefor.

In column 7, line 38, insert -- the -- before "kernel".

In column 7, line 57, after "is" insert -- a --.

In column 8, line 62, in Claim 1, after "size" delete "," and insert -- ; --, therefor.

In column 9, line 53, in Claim 8, after "structure" insert -- stored --.

In column 10, line 7, in Claim 12, delete "systems," and insert -- system, --, therefor.

In column 10, line 57, in Claim 18, delete "ROMS;" and insert -- ROMs; --, therefor.

CERTIFICATE OF CORRECTION (continued)
U.S. Pat. No. 7,017,004 B1

In column 10, line 60, in Claim 18, after "one of the" delete "of the".

In column 11, line 13, in Claim 22, delete "processor" and insert -- processors --, therefor.

In column 11, line 40, in Claim 22, delete "int" and insert -- in --, therefor.

In column 12, line 6, in Claim 27, delete "ore" and insert -- or --, therefor.

In column 12, line 26, in Claim 28, after "comprising" insert -- computer --.

Signed and Sealed this

Twentieth Day of April, 2010

David J. Kappos
*Director of the United States Patent and Trademark Office*